United States Patent [19]

Smith et al.

[11] Patent Number: 4,981,882

[45] Date of Patent: Jan. 1, 1991

[54] METHOD FOR ENHANCING ENCAPSULATION EFFICIENCY IN COATING PARTICLES IN AQUEOUS DISPERSIONS

[75] Inventors: Oliver W. Smith, Charleston; Kenneth L. Hoy, Kanawha, both of W. Va.

[73] Assignee: Union Carbide Chemicals and Plastics Company Inc., Danbury, Conn.

[21] Appl. No.: 331,305

[22] Filed: Mar. 31, 1989

[51] Int. Cl.$^5$ .......................... C08K 9/04; C08K 3/24; C08J 3/02

[52] U.S. Cl. ................................. 523/205; 524/457; 523/200

[58] Field of Search ................. 523/205, 200; 524/457

[56] References Cited

U.S. PATENT DOCUMENTS 3,544,500  12/1970  Osmond et al. ..................... 523/201

Primary Examiner—Joseph L. Schofer
Assistant Examiner—John J. Guarriello
Attorney, Agent, or Firm—Norman L. Balmer

[57] ABSTRACT

Aqueous dispersions of particles stabilized by a basic dispersant are rendered suitable for particle encapsulation or coating processes by polymerization from the aqueous phase by treatment with certain ethylenically-unsaturated carboxylic acids.

20 Claims, No Drawings

METHOD FOR ENHANCING ENCAPSULATION EFFICIENCY IN COATING PARTICLES IN AQUEOUS DISPERSIONS

This invention relates to processes for applying polymer coatings to particles which are contained in stabilized aqueous dispersions, and, more particularly, to improving the encapsulation efficiencies by treating the stabilized aqueous dispersions prior to effecting polymerization to form the polymeric coating.

BACKGROUND OF THE INVENTION a. Coating Processes

The coating, or encapsulation, of pigments with a polymer has frequently been proposed for paint formulations or colorants for molding compositions. The polymer coating can serve several functions including assisting in preventing agglomeration of the particles upon settling or drying and/or facilitating breaking up any agglomerates that do form; facilitating incorporation of the particles into the final coating or molding; binding together pigments of different colors to produce a single desired coating and avoid segmentation of the pigments; and, in the case of reflective pigments such as titanium dioxide, providing a distance between the particles to minimize localized regions of high pigment concentration and thereby maximize hiding power per unit weight of pigment.

These proposals include Newman in U.S. Pat. No. 3,133,893 who discloses pigment particles coated with a polymer which is polymerized in situ by stabilizing pigment particles of less than 1.5 microns, mostly between 0.01 and 0.5 microns, in an aqueous medium in which an emulsion polymerization is carried out to form the polymer coating.

Osmond, et al., in U S. Pat. No. 3,544,500 disclose a complex process for encapsulating solid particles, e.g., pigments. The process involves first adsorbing a polymer on the surface of the particles and providing a stabilizer having an anchor group which becomes associated with the adsorbed polymer on the surface and a pendant hydrophilic component solvated by the aqueous phase and so provides a stabilizing sheath around the particles. The pretreated particles can then be subjected to aqueous emulsion polymerization of a monomer in an aqueous phase to effect the encapsulation. The polymer to be adsorbed on the surface is soluble in an aqueous medium containing the particles and a modification is effected to make the polymer insoluble The patentees disclose at column 3, lines 67 et seq., that the polymer to be adsorbed should contain strong polar groups to promote adsorption on the surface of the particles. At column 2, lines 1, et seq., the patentees state:

"The particles may be dispersed in a solution of the polymer and stabilizer in the liquid but preferably they are dispersed in a solution of the polymer in the liquid, the stabilizer being added after dispersion of the particles. In the second stage of the preparatory treatment the nature of the solution is modified so that the adsorbed polymer is no longer soluble in the liquid continuous phase but the chain-like hydrophilic component of the stabilizing compound remains solvated by it. As a result of the modification of the solution the anchor component of the stabilizer becomes associated with the now insoluble polymer absorbed on the disperse particles whilst the other chain-like component remains solvated by the liquid forming the continuous phase and provides a stabilizing sheath around the particles. The stabilizer may be added before the modification of the solution or at the same time as the modification takes place."

The patentees further state at column 3, lines 31, et seq., that:

"In general, because of the need to modify the solution containing the stabilizer, the stabilizer will be a non-ionic one providing a steric stabilizing sheath around the particles. Optionally such nonionic stabilizers may be supplemented by ionic types . . . and these ionic types are preferably added after that [preparatory] stage."

Clarke, et al., in U.S. Pat. No. 3,580,880 disclose allegedly stable dispersions and the preparation of same. Particulate solids are said to be dispersed in a liquid with a polymer comprising one chain-like lipophilic pendant component which is capable of being solvated in a lipophilic liquid and at least one nonionic chain-like component which is solvated by a hydrophilic liquid to effect what the patentees refer to as an entropic stabilization (Column 2, lines 15 to 33). The polymer may comprise as the hydrophilic component non-ionic chain-like components with a molecular weight of 350–5000 and the lipophilic component is sufficiently long to provide a barrier 12 Angstroms in thickness around the particles.

Schofield in U.S. Pat. No. 4,349,389 describes dispersible inorganic pigment compositions in which the surface of the finely divided inorganic pigment particles is coated with a substance rendering the surface hydrophobic ("hydrophobing agent"), said substance preferably being an amphiphile containing one or more hydrophobic chains of carbon atoms interrupted by O, N or S atoms, and one or more hydrophilic groups such as amino groups, quaternary ammonium groups, carboxylic groups, etc wherein the hydrophilic group or groups anchors the hydrophobic chain to the pigment surface and a layer of a thermoplastic polymer evenly covers and adheres to the hydrophobic chain Solc in U.S. Pat. No 4,421,660 discloses aqueous dispersions of polymer coated particles, including titanium dioxide pigment particles, produced by first emulsifying polymerizable monomers with a chemical dispersant and/or surfactant and then polymerizing the monomer and coating on the particles with the particles resulting from the polymerization. The patentee discloses the use of high shear conditions, e.g., produced by an ultrasonic probe, to effect a colloidal dispersion of particles. Typically, the dispersion of solid particles is permitted to stand overnight after which the top layer of colloidal dispersed pigment is decanted and used in an emulsion polymerization. The encapsulated particles are particularly intended for applications requiring a colloidal size particulate having magnetic properties. The percent solids contents of the encapsulated particles set forth in the examples were too low without concentration for practical use in the manufacture of water-based paint.

Farrar, et al., in U.S. Pat No. 4,507,422 describe aqueous dispersions of pigments containing as a dispersing agent a water soluble polymer having a polydispersity of below 1.5 (i e., a narrow molecular weight range) and a molecular weight in the range of about 1000 to 5000. The preferred polymers and polymers of acrylic acid (or copolymers) with 2-acrylamido-2-methyl propane Martin in U.S. Pat. No. 4,608,401 describes finely divided water insoluble particles free of ionic charges and states that the particles are given a generally uniform polymeric encapsulation. The patent states that such materials are obtained by mixing in an aqueous reaction medium a water insoluble monomer polymerizable to form a generally water insoluble polymer free of ionic charges in the presence of a nonionic surface active stabilizing agent, thereafter polymerizing the monomer using a redox polymerization initiating system which is free of ionic groups and does not decompose to release ionic groups in the reaction medium. The patent also states that naturally agglomerated particulate materials are effectively dispersed in situ during polymerization thereby eliminating the need for preliminary grinding and/or dispersion treatments. The patentee emphasizes that the medium be substantially free from anionic or cationic surface active or dispersing agent. The nonionic stabilizing agent is said to have sufficient hydrophilic-lipophilic power to possess good emulsifying action and have an HLB of at least about 13. The patentee broadly discloses alkylphenyl and derivatives thereof as lipophilic components and ethylene oxide chains as hydrophilic groups, i.e., from about 10 to up to 200 or more —$(CH_2CH_2O)$— groups. Nonylphenol ethoxylates are the only agents used in the examples.

Solc in U.S. Pat. No. 4,680,200 describes the encapsulation of organic pigment solids in a hydrophobic polymer made by dispersing the monomer in an aqueous colloidal dispersion of the organic particles followed by emulsion polymerization Gibson, et al., in U.S. Pat. No. 4,413,073 disclose stable aqueous film-forming dispersions. The dispersions are said to be stable to harsh processing such as ball-milling and sand grinding which are sometimes necessary for the incorporation of certain pigments. See column 6, lines 8 to 18. The patentees do not disclose encapsulating particulate solids. Rather, the disclosure pertains to dispersions of particles of film-forming polymer such as alkyd resin in the presence of a stabilizing compound having an HLB value of at least 8 and whose lipophilic portion comprises at least one ethylenic double bond.

Daniel, et al., in European Patent Application 38730 disclose fine iron oxide ($Fe_3O_4$) particles (less than 0.01 microns) emulsified in an anionic agent (e.g., $C_{12}H_{25}OSO_3Na$) and non-ionic surfactant, e.g., ethoxylated adduct of nonylphenol having 30 ethylene oxide units.

Many of these proposals recite the use of unsaturated carboxylic acids such as maleic acid, methacrylic acid and acrylic acid as possible monomers for the coating.

In copending U.S. patent applications Ser. Nos. 109,326 and 319,415, filed Oct. 19, 1987, and Mar. 6, 1989, respectively, by Hoy, et al , both entitled Micro Composite Systems and Processes for Making Same, coating processes which are suitable for coating finely divided particles in aqueous dispersions, are disclosed Hoy, et al., use amphiphilic polymers having certain lipophilic and hydrophilic properties to enhance encapsulation efficiencies.

b. Encapsulation Efficiencies

In many instances, the particles which are intended to be coated or encapsulated, e.g., titanium dioxide, are manufactured in a non-agglomerated form. When dried, these particles often agglomerate. Hence, when the particles are to be coated, the agglomerates must be broken up which adds to processing costs and may require additional equipment. Especially for latex paint formulations, particles such as titanium dioxide pigments are available from the manufacturer in stabilized, aqueous dispersions to avoid the need to incur the costs associated with redispersing the particles. Normally, a basic stabilizer is used because of its chemical and pH compatibility with most latex paint formulations.

The use of stabilized aqueous dispersions in coating or encapsulation processes has met with difficulties since these stabilizers tend to reduce the "Encapsulation Efficiency" in the coating process. "Encapsulation Efficiency" is the weight percent of the hydrophobic polymer that coats the particulate solids. The following formula can be used to calculate Encapsulation Efficiency:

$$\text{Encapsulation Efficiency} = \frac{\text{Polymer Observed as Coating}}{\text{Theoretical Polymer for Coating}}$$

Hence, polymer that nucleates to form polymer-only particles reduces the Encapsulation Efficiency In processes such as disclosed by Solc in U.S. Pat. No 4,421,660, relatively low Encapsulation Efficiencies are typically obtained due to the use of surfactant that readily forms micelles in amounts far in excess of the critical micelle concentration. Hence, the use of stabilized aqueous dispersions of the particles may not result in further undue reductions in Encapsulation Efficiencies. However, in processes which strive toward achieving high Encapsulation Efficiencies, the loss in Encapsulation Efficiencies caused by the stabilizer in the aqueous dispersion is generally unacceptable.

While the stabilizer used in making the stable aqueous dispersion of particles may be changed to one more compatible with the coating or encapsulation processes, this would require reformulations on the part of the particle manufacturer. Moreover, unless the manufacturer maintains separate lines of products, conventional users of stabilized aqueous dispersions may have to reformulate to use an aqueous dispersion made for coating or encapsulation processes. Another approach is to treat the stabilized aqueous dispersion prior to coating such that the stabilizer does not unduly adversely affect the Encapsulation Efficiency. For such a treatment to be practical, it must not only be effective but also be inexpensive and easily accomplished.

SUMMARY OF THE INVENTION

By this invention, coating or encapsulation processes are provided that enable aqueous dispersions of particles which dispersions have been stabilized with basic dispersant, to be used without undue reduction in Encapsulation Efficiency due to the presence of the basic dispersant. In the processes of this invention, ethylenically-unsaturated carboxylic acid is used to treat the stabilized aqueous dispersion prior to the encapsulation or coating of the particles with polymer.

In accordance with this invention, the stabilized aqueous dispersion of particles is treated with ethylenically-unsaturated carboxylic acid wherein at least one of the double-bonded carbon atoms is substituted. Often the carboxylic acid is represented by the formula

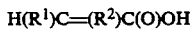

$$H(R^1)C=(R^2)C(O)OH$$

wherein $R^2$ is $-C(H)(R^3)-(CH_2)x-$ wherein x is 0 to about 10, often 0 to about 4, $R^1$ and $R^3$ are each selected from H, $-C(O)OR^4$, $-CH_2C(O)OR^4$, substituted or unsubstituted alkyl of 1 to about 20, often 1 to 6 carbon atoms, substituted or unsubstituted mono and bi-cyclic aryl or alkaryl of 7 to about 30, preferably 7 to about 10, carbon atoms, substitution may be with, e.g., halide, hydroxy or alkoxy groups of 1 to about 10 carbon atoms; wherein $R^4$ may be H or lower alkyl of 1 to about 6 carbon atoms with the proviso that only one of $R^1$ and $R^3$ can be H. Preferably the carboxylic is water soluble. The amount of the carboxylic acid is sufficient to enhance Encapsulation Efficiency. The treating of the aqueous dispersion is conducted at a temperature and for a time sufficient to enhance the Encapsulation Efficiency. Preferably, the treating is performed while the aqueous dispersion is under agitation.

The aqueous dispersion is provided with a sufficient amount of at least one amphiphilic component to enhance the stability of the aqueous dispersion under polymerization conditions. The at least one amphiphilic component may be provided before, during and/or after treating the aqueous dispersion with the carboxylic acid.

To the treated aqueous dispersion containing the at least one amphiphilic component is added material capable of being addition polymerized to form the hydrophobic polymer which coats or encapsulates the particles, and the aqueous dispersion is subjected to polymerization conditions to form the polymer coating. The Encapsulation Efficiences achievable in accordance with this invention are often greater than about 80, preferably greater than 90, percent.

DETAILED DESCRIPTION

The stabilized aqueous dispersions of particles to be treated in accordance with this invention contain a basic dispersant or stabilizing agent. The chemical compositions of the dispersants are typically maintained trade secret by the manufacturers. These aqueous dispersions typically contain amine compounds, i.e., primary, secondary and/or tertiary amines. The dispersants are frequently present in an amount of about 0 1 to 10, say, 0.5 to 5, weight percent based on the total weight of solids in the aqueous dispersion. Often the pH of the aqueous dispersions is between about 7 and 11, and many times the pH is between about 8 and 10.

The aqueous dispersions generally contain between about 20 to 85, e g , 40 to 80, weight percent solids. The liquid phase preferably contains at least about 50, more preferably, at least about 90, volume percent water. Other solvent or liquid can be present, e.g., ethylene glycol, ethanol, propanol and propylene glycol, as well as other typical additives for emulsion polymerization such as defoamers, plasticizers, etc.. Most frequently, when such other components are present, the aqueous medium is in a single liquid phase and the other components do not dissolve or swell the hydrophobic polymer. The aqueous dispersion may contain other adjuvants such as surfactants, biocides, etc.

The particulate solids employed in the present invention often have a surface capable of adsorbing hydrophilic polymers, i.e., have a hydrophilic surface, even though the particles may be essentially water insoluble. A surface is hydrophilic when a polyethylene glycol of a molecular weight of about 400 is more strongly adsorbed than benzene. Preferably, the surface is more hydrophilic than silica. Solids having hydrophilic surfaces include those comprised of metal oxides, metal salts such as phosphates, sulfates, and the like and organics having carbonyl, carboxylic, amine, phosphate, urethane, sulfate, sulfonate, phosphonate and the like groups, on at least the surface of the particles. As is well known, metals such as aluminum, iron, titanium, silver and gold oxidize in air and, hence, the surfaces of such materials are hydrophilic in nature. The solid to be coated in accordance with this invention may be composites, e.g , may have coating or layer of a material providing a hydrophilic surface.

Exemplary of solids are water insoluble solids such as inorganic solids including inorganic pigments such as titanium dioxide, zinc oxide, antimony oxide, magnesium oxide, fly ash, red iron oxide, glass particles, yellow iron oxide, lemon chrome and cobalt blue; powders of metals including titanium, copper, brass, gold and stainless steel; carbonates such as calcium and magnesium carbonates; phosphates such as calcium and lead phosphates; silica and silicates such as clay, calcined clay, mica and glass particles; chromates such as lead chromate; metal salts such as silver chloride; inert ferrites; aluminum hydrates; and the like. Of particular interest are flakes, fibers and powders of metals and metal alloys such as aluminum, cobalt, iron, copper, nickel, chromium, zinc, palladium, silver, ruthenium, platinum, gold, rhodium, lead and alloys of these metals. Also of interest are the oxides of such metals, particularly magnetic oxides such as iron, nickel, cobalt or alloys thereof, as well as metal oxides, e.g., alumina or silica, or oxides of other elements, such as titanium dioxide and barium oxide, and other inorganic materials such as sulfates such as barium sulfate; dielectric materials such as perovskites, barium titanates. etc., and electrical conductors including super conductors. The surface of the particles may be of a different composition than the underlying structure. The solid surface of the particles may thus be selected to provide the desired hydrophilic properties. Composite solids include, e.g., aluminum having an aluminum oxide surface thereon and conventional titanium dioxide pigments having alumina, silica or alumina and silica coatings thereon.

Other solids that can be employed in this invention are organic pigments such as the essentially water-insoluble organic pigments including the rhodamines, the phthalocycanines and laked pigments, e.g , the azo lakes, as well as those pigments disclosed in U.S. Pat. No. 4,194,920, which is incorporated herein by reference. Other examples of such organic solids are organic fillers, catalysts and the essentially water-insoluble organic fire retardant additives such as decabromodiphenyloxide.

The particulate solids to be coated or encapsulated may be in any desired configuration and are of a size capable of being dispersed in an aqueous medium. Frequently, the particulate solids have an average particle size of less than about 2 microns. For pigments, the particle size is most often below about 1 micron. Advantageously, with pigments that perform by light scattering, particle sizes of between about 0 1 to 0.7 micron are employed. While this invention can provide coated particulate solids for paints, molding resins, and other colorant utilities, the coated particles can find application in electronic, medical and other applications. Hence, the size of the particulate solids will vary depending upon the intended application of the coated particle, and the size may vary from, say, 50 or 100 Angstroms to 50 or 100 or more microns.

The preferred aqueous dispersions for use in the processes of this invention contain titanium dioxide pigment of an average particle size of between about 0.1 and 0.7 micron which particles may or may not have a coating of alumina, mixtures of silica and alumina or zinc oxide thereon. Usually, the coating is in an amount of about 1 to 8, say, 2 to 6, weight percent based on the total weight of the particles. Exemplary of stabilized, titanium dioxide pigment dispersions is TiPure ® R-940 available from E. I. du Pont de Nemours & Co., Wilmington, Delaware.

Representative carboxylic acids include acids and acid anhydrides that yield the acid in the aqueous media such as maleic acid, maleic anhydride, fumaric acid, methacrylic acid and 3-butenoic acid, itaconic acid, angelic acid, tiglic acid, isocrotonic acid, crotonic acid and allylacetic acid. Often, alpha, beta unsaturated carboxylic acids are used. The carboxylic acids are often water soluble, preferably in amounts of at least about 10 grams per liter at 25° C. Acids such as acrylic acid do not provide the enhancement in Encapsulation Efficiency as does, say, maleic acid.

The amount of carboxylic acid used in the treatment is sufficient to enhance Encapsulation Efficiency. In general, large excesses of the carboxylic acids are unnecessary and are to be avoided when they can result in adverse effects on the properties of the sought hydrophobic polymer coating. Sometimes, the amount of carboxylic acid used is between about 0.05 to 5, e.g., 0.2 to 2, weight percent based on the weight of the particles in the dispersion. With di- and polyfunctional acids, the amounts may be decreased proportionately. As the carboxylic acids are acidic, the pH of the aqueous dispersion will be affected. Normally the pH of the treated aqueous dispersion is between about 5 to 9, say, about 7 to 8.8.

The conditions of the treating with the carboxylic acid can vary widely. Usually the temperature is about 15° to 80° or 90° C., preferably 25° to 65° C. The carboxylic acid should be in contact with the particles prior to initiation of the polymerization. The contact is for a sufficient period prior to initiation of the polymerization to enhance the Encapsulation Efficiency. Usually, this period is at least 1 minute, and is often for a period of at least 5 minutes. The introduction of the carboxylic acid may tend to destabilize the aqueous dispersion. Accordingly, the treatment is generally conducted within about 7 days of the initiation of the polymerization, or other components are added to assist in stabilizing the dispersion such as surfactants and/or thickeners that are operative at pH's below about 8. These surfactants and/or thickeners include the amphiphilic components used in the invention Agitation, or mixing of the aqueous dispersion during the treatment, is preferred not only to facilitate the treatment but also to avoid undue settling of the particles. The mixing may be effected by stirring, shaking, pumping, ultrasonification and the like.

The formation of the polymer coating is benefited by the inclusion of at least one amphiphilic component in the aqueous dispersion. The amphiphilic component is provided in an amount to assist in stabilizing the dispersion of the coated particles. Moreover, in many instances, the amphiphilic component can also enhance Encapsulation Efficiency.

The amphiphilic components may be amphiphilic polymers such as disclosed by Hoy, et al., in the above referenced U.S. patent applications Ser. Nos. 109,326 and 319,415, having a hydrophilic backbone which is a hydrocarbyl-containing chain having a weight average molecular weight of at least about 3000 and having a hydrophilic moiety on average less than 2.5 carbon atoms apart, preferably said backbone has a hydrophilicity equivalent to at least about $-(CH_2CH_2O)-_{70}H$, and said backbone at least one lipophilic segment pendant therefrom such that the amphiphile polymeric exhibits an LHB, hereinafter defined, value or greater than about 1.5, preferably greater than about 2, to enhance compatibility of the surface of the solid with lipophobic components.

The amphiphilic component need not be an amphiphilic polymer as described above but may be a surfactant (anionic, nonionic or cationic). Generally, when high Encapsulation Efficiencies are sought, anionic and cationic surfactants are sparingly used since they tend to generate sites in the aqueous dispersion separate from the particles at which polymerization can occur. In general, it is preferred to use the amphiphilic component in total amounts which in the system are below those which form an undue amount of stable micelles. Stable micelles provide sites at which monomer can polymerize and thus reduce the Encapsulation Efficiency. The concentration of amphiphilic component at which stable micelles are formed will depend upon the system, and concentrations greater than the critical micelle concentration may be used without the undue formation of stable micelles. Many amphiphilic polymers do not readily form stable micelles even though they may be present in amounts greater than the critical micelle concentration. The critical micelle concentrations are usually determined under conditions which favor the formation of micelles. These conditions are not generally present in coating and polymerization systems which involve agitation and short residence times. Surfactants such as cationic and anionic surfactants tend to more readily form stable micelles than do nonionic surfactants, and with respect to nonionic surfactants, the longer the hydrophilic chain the more difficult to form micelles and the less pronounced is the critical micelle concentration. Moreover, the presence of other components in the systems, e g., the particle surface to be coated or encapsulated and surfactant, if any, can affect the concentration of amphiphilic component needed to form micelles and the rate of formation and stability of the micelles. For instance, any amphiphilic component adsorbed on the substrate surface would not be available for undesirable micelle formation. In any event, at least sufficient amphiphilic component is used to provide on a theoretical basis a bilayer defining a hydrophobic zone, over at least a portion, e.g., at least 25, preferably at least 50, percent of the particle surface area. The amount of amphiphilic component used for the best coating results will, nevertheless, be dependent upon other components in the coating system as well as the nature of the surface to be coated. The relative amount of total amphiphilic component should be sufficient to provide enhanced stability to the dispersion of particles to be coated, yet maintain the aqueous medium at a viscosity within suitable ranges.

The amphiphilic polymers are characterized as having a hydrocarbyl-containing hydrophilic backbone having a hydrophilic moiety on average less than about 2.5, often between about 1 and 2.5, carbon atoms apart, preferably having a hydrophilicity equivalent to at least about —(CH$_2$CH$_2$O)—$_{70}$H, and at least one lipophilic segment pendant from the backbone such that the amphiphilic polymer exhibits an LHB value of at least about 1.5, preferably at least about 2. Often, the LHB value is about 1.5 to 15, for instance, about 2 to 12. The LHB value for an amphiphilic polymer is determined by dividing the weight average molecular weight of the lipophilic segment(s) on the backbone by the weight average molecular weight of the amphiphilic polymer times 20. For instance, a nonylphenol ethoxylate having about 70 —(CH$_2$CH$_2$O)— units would have an LHB value of about 1.2. If two nonylphenol groups were present, the ethoxylate would have an LHB value of about 2.2.

Hydrophilic moieties include ether oxygen atoms, double-bonded oxygen, hydroxyl groups, carboxylate groups, thio groups, amido groups, amino groups, imido groups, sulfonyl groups, phosphonyl groups, carbamate groups, carbonate groups, phosphate groups, sulfate groups and the like. Hence, these groups can be integral within the backbone such as in a poly(oxyethylene) chain or an ether in a celluosic structure, or they can be pendant from the hydrocarbyl-containing backbone such as hydroxyl groups and carboxylate groups. The molecular weight of the hydrophilic backbone is preferably at least about 2500, say, at least about 3000 to 2 million or more. The backbone preferably contains in direct chain relationship (as opposed to being in pendant groups) at least about 100 carbon atoms, e.g , at least about 140, say. 150 to 150,000 carbon atoms (on a weight average basis). In general, with the longer backbones for a given type of amphiphilic polymer, the more strongly the coating is bonded to the surface. The amphiphilic polymer can be selected on the basis of its interaction with the surface to be coated. Some amphiphilic polymers seem better suited for certain surfaces while other amphiphilic polymers may be less desirable, but yet, for other surfaces, the rankings of the amphiphilic polymers may be changed. Often, with less hydrophilic surfaces, amphiphilic polymers having longer backbones and stronger polar (hydrophilic) moieties are preferred.

The hydrophilic backbone of the amphiphilic polymer may contain lipophilic groups or segments. The lipophilic segments are termed as being "pendant" but may include terminal groups as well. The lipophilic moieties may comprise aliphatic and/or aromatic hydrocarbyl groups, e.g., alkyl, alkenyl, aryl, alkynyl, aralkyl, alkaryl groups which may each have from 1 to about 40 carbons, preferably, from about 6 to 35 carbons. Preferably, the hydrocarbyl groups are of a sufficiently low molecular weight and/or low linearity that the amphiphilic polymer is essentially non-crystalline (amorphous). Advantageously, the Krafft point of the amphiphilic polymer as determined at a 20 weight percent solution in distilled water is below about 70° C., preferably below about 50° C. and even more preferably below about 25° C. Hence, cyclic (especially aromatic) and branched hydrocarbyl lipophilic segments are preferred over linear hydrocarbyl segments. Most frequently, more than one lipophilic segment will be pendant from the hydrophilic backbone.

One preferred type of amphiphilic polymer contains at least about 50, preferably at least about 70, say about 70 to 10,000 or 20,000, —(CH$_2$CH$_2$O)— units ("EO Units"). Advantageously, at least about 50, preferably at least about 70, EO units are provided which are unbroken by a lipophilic group within the backbone, although a lipophilic group may depend from the backbone (however, one or more hydrophilic groups may break the EO chain). While not wishing to be restricted to theory, it is believed that the long, uninterrupted hydrophilic chain enhances the attraction between the amphiphilic polymer and the surface of the particulate solid. It is even conceivable that the EO chain may loop away from the surface of the particulate solid to provide pockets of hydrophilicity within the hydrophobic zone defined by the lipophilic segments. With sufficiently long EO chains, the hydrophilic backbone may attach at several points to the surface of the particulate solid.

One type of amphiphilic polymer is known as polymeric associative thickeners. Polymeric associative thickeners useful in the present invention generally have a molecular weight (weight average) of 10,000 to 2 million, preferably 75,000 to 750,000 In addition, the polymer comprises, in a single molecule, a polymeric backbone containing more than one hydrophobic segment and at least one hydrophilic segment. In one embodiment, the hydrophobic segment contains in the average molecule more than one pendant hydrophobic group, e.g., a nonylphenoxymethyl group, bonded to the polymeric backbone. The hydrophilic segment contains a plurality of hydrophilic groups, e.g., polyoxyethylene groups, comprising at least a portion of the backbone. Suitable polymeric associative thickeners are set forth in the Examples and additional polymeric associative thickeners are described in U.S. Pat. Nos. 4,426,485; 4,496,708; 3,779,970; 4,304,902; 4,228,227; 4,209,605, European Patent Publication No. 0013836, and European Patent Publication No. 0011806, the disclosures of all of which are incorporated herein by reference.

The polymeric associative thickeners having two or more hydrophobic segments are termed as comprising "bunched hydrophobic groups" when the hydrophobic segments are in close association, or proximity, with each other, e.g , within about 50, most preferably within about 25, covalently bonded, sequentially connected atoms. Polymeric associative thickeners having bunched hydrophobes are disclosed in U.S. Pat. No. 4,426,485.

A class of polymeric associative thickeners useful in the present invention have the formula

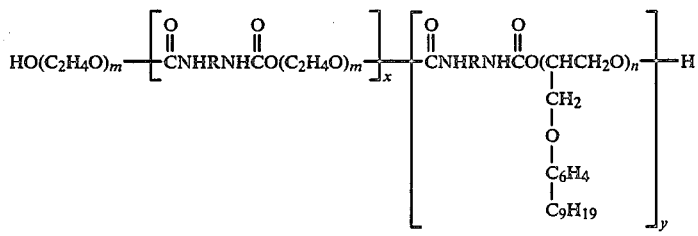

wherein R is a divalent organic group such as alkylene, arylene, alkenylene, alkarylene, aralkylene, cycloalkylene and cycloalkenylene, m is a number having an average value of about 90 to about 320, preferably about 180 to about 230, n is a number having an average value at least about 1 and preferably 1 up to about 30, x is a number having an average value of greater than about 1, preferably about 5 to about 25, and y is a number having an average value of greater than about 1 and preferably from more than about 1 to about 10. Associative thickeners of this type are conveniently used as a solution in butyl carbitol, e.g., about 16 wt. % with water preferably being about 64 wt. %. Polymeric associative thickeners of this type are disclosed in U.S. Pat. No. 4,426,485.

Associative thickeners also include hydrophobized polysaccharides, e.g., hydrophobized starches, celluloses and gums such as xantham gums and gum arabic. Hydrophobizing groups represent the pendant lipophilic moieties as discussed above.

Frequently, the amphiphilic polymer is relatively free from ionic groups, e.g., often less than 2 or 3 ionic groups are provided on average per molecule, and in most instances the amphiphilic polymer is nonionic. When ionic moieties are present, they should be in an amount which, at the concentrations of amphiphilic polymer desired to provide, e.g., enhanced bonding and particle dispersion, does not result in an undue reduction in Encapsulation Efficiency. The amphiphilic polymer may contain reactive groups such as those that may copolymerize with the hydrophobic polymer. Often, the amphiphilic component, when used, is provided in an amount of at least about 0.01 weight percent based on the weight of particulate solids, e.g., from about 0.01 to 5, say, about 0.5 to 2, weight percent based on the weight of particulate solids.

Whether or not amphiphilic polymers are used, the amphiphilic component preferably includes nonionic surfactant. The desirability of using a nonionic surfactant will be related to whether an amphiphilic polymer is used and, if so, the type of amphiphilic polymer as well as the polymerization system employed. In general, the more widely dispersed the lipophilic segments in the amphiphilic polymer, the more desirable to use a nonionic surfactant. With many amphiphilic polymers in a vinyl latex polymerization system, nonionic surfactant may not be essential; however, with acrylic polymerization systems, the nonionic surfactant can be quite beneficial. The nonionic surfactant has a hydrophilic component less hydrophilic than the hydrophilic backbone of the amphiphilic polymer. The HLB value of the nonionic surfactant may vary widely, e.g., from about 5 to 19.5 or more, e.g., about 10 to 19. It should be noted that when combinations of amphiphilic polymers are used with one of the amphiphilic polymers having a hydrophilic backbone, e.g., an EO chain, which is neither interrupted nor terminated with a hydrophobic groups at both ends, desirable Encapsulation Efficiencies may be obtained in some systems even in the absence of nonionic or other surfactants.

The amount of nonionic surfactant, when used, is preferably present in an amount insufficient to unduly adversely affect the Encapsulation Efficiency. While the nonionic surfactant can contribute to obtaining a stable dispersion of coated particles, often the primary factor in the stabilization is the amphiphilic polymer. If desired, the nonionic surfactant can be used in an amount sufficient to provide a reasonably stable aqueous dispersion of the hydrophobic polymer coated particulate solids. When used, the nonionic surfactant is typically present in an amount of about 1 weight percent to about 30 weight percent, preferably about 5 weight percent to about 20 weight percent, based on the weight of the particulate solids. If unduly large amounts of nonionic surfactant are used, risks exist that micelles will form in the aqueous phase and provide nucleation sites for the generation of polymer particles and thus reduce Encapsulation Efficiency. Frequently, the nonionic surfactant is provided in a weight ratio of surfactant to amphiphilic polymer, if used, of 0 to about 100:1, say, about 1:1 to 50:1, more preferably, about 3:1 to 40:1.

Nonionic surfactants suitable for use in this invention contain a hydrophilic group such as a polyoxyethylene chains and a hydrophobic group such as the nonylphenyl group. Also included as suitable nonionic surfactants are the polycondensates of propylene oxide and ethylene oxide with various hydrophobic groups. Examples are octyl or nonyl phenol polyethoxylates containing 10 to 150 EO groups, polyethoxylated esters of fatty acids, polyethoxylated esters of fatty alcohols, ethylene oxide/propylene oxide block copolymers, fatty amine ethoxylates, alkyl-phenol formaldehyde novolac resin alkoxylates and the like, and the nonionic surfactants such as described in U.S. Pat. No. 4,608,401, columns 11–13; and U.S. Pat. No. 4,209,333, both incorporated herein by reference.

Sometimes a water soluble anionic dispersant is used in the amphiphilic component. While anionic dispersants most commonly find use in providing dispersions of particulate solids for encapsulation, they are seldom preferred due to the tendency to form micelles or otherwise reduce Encapsulation Efficiencies. If an anionic dispersant is used, it often is present in an amount of about 0.1 to about 10, preferably about 0.5 to about 2%, by weight of the particulate solids. Anionic dispersants include salts of fatty acids such as potassium oleate, metal alkyl sulfates, such as sodium lauryl sulfate, salts of alkylaryl sulfonic acids such as sodium dodecylbenzene sulfonate, polysoaps such as sodium polyacrylate copolymers of alkali metal poly(meth)acrylates with various comonomers, and alkali metal salts of methyl methacrylate/2-sulfoethyl methacrylate copolymers and other sulfoalkyl acrylate copolymers, and other anionic surfactants such as the dihexyl ester of sodium sulfosuccinic acid; alkyl-sulfoxide and alkyl-sulfone terminated oligomers as described in U.S. Pat. Nos. 3,776,874 and 3,668,230; alkylsulfoxide terminated oligomers as described in U.S. Pat. No. 3,772,382; alkyl-sulfide terminated oligomers as described in U.S. Pat. Nos. 3,632,466; 3,498,942; 3,498,943 and 3,839,405. The potassium or ammonium salts of functionalized oligomers, e.g., Polywet TM varieties sold by Uniroyal Chemical, can be used as the anionic dispersant. When using anionic surfactants, ammonium salts are usually preferred to minimize the tendency toward micelle formation and thus maintain acceptable Encapsulation Efficiencies. Such surface active agents or emulsifiers are employed in amounts sufficient to enhance the ability to achieve a stable dispersion of the particulate solids in the aqueous medium. Anionic surfactants or dispersants can generally be used after encapsulation or coating without undue adverse effect on the Encapsulation Efficiency.

The hydrophobic polymer provides the coating on the surface and is produced by polymerization of polymerizable components while the surface is in an aqueous medium. The polymerizable components may be prepolymers or monomers. For the sake of convenience, both prepolymers and monomers will be referred to herein as "monomers" since they take part in further polymerization or cross-linking. The amount of monomer used is not narrowly critical and can range from about 1 wt. part monomer per about 9 wt. parts of particulate solids to about 9 wt. parts monomer per about 1 wt. part of particulate solids.

The monomers employed in the present invention to produce the hydrophobic polymer coating on the particle surface include essentially water immiscible monomers as well as those that are miscible in water. The selection of the monomer and polymerization system is made in concert with the other components of the system. Conditions such as pH and temperature for a given polymerization system need to be taken into account when selecting the amphiphilic component. For instance, temperature and pH can affect performance, hydrophilicity and critical micelle concentrations of amphiphilic components.

Examples of monomers include monovinylidene aromatic monomers such as styrene, vinyl toluene, t-butyl styrene, chlorostyrene, vinylbenzyl chloride and vinyl pyridine; alkyl esters of alpha, beta-ethylenically unsaturated acids such as ethyl acrylate, methyl methacrylate, t-butyl acrylate, n-butyl acrylate and 2-ethylhexyl acrylate; unsaturated esters of saturated carboxylic acids such as vinyl acetate; unsaturated halides such as vinyl chloride and vinylidene chloride; unsaturated nitriles such as acrylonitrile; dienes such as butadiene and isoprene; and the like. Of these monomers, the unsaturated esters such as vinyl acetate, the alkyl acrylates and methacrylates, such as butyl acrylate and methyl methacrylate, are preferred. In addition to the aforementioned hydrophobic monomer, relatively minor portions, e.g., less than 10, preferably less than 5 weight percent based on total monomer component, of water-soluble monomer such as an ethylenically unsaturated carboxylic acid or its salt such as acrylic acid or sodium acrylate; methacrylic acid; itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. However, the water-soluble monomers may not be employed in amounts sufficient to render the resulting polymer soluble in water. Particularly effective monomer recipes for the practice of this invention are those containing from about 20 to about 90 weight percent of vinyl acetate and from about 10 to about 80 weight percent of alkyl acrylate such as n-butyl acrylate or t-butyl acrylate with said weight percentages being based on the weight of total monomers. Preferably the monomers used for the initial polymerization do not include those capable of readily adding amine groups across the double bond. Once encapsulation has commenced, the monomers may contain those which can readily add amine groups.

The polymer coating may comprise the same polymer throughout its thickness or the polymer may vary. For instance, monomers to provide a hydrophobic polymer which readily coats the substrate surface may first be used with a different monomer or comonomer blend being used for at least a portion of the reminder of the coating thickness. This portion of the coating may have different properties than that initially applied. For example, this portion of the coating may be tougher and/or more rigid and may less readily coat the substrate surface than the first portion of the coating. Also, in this manner a portion of the coating can be swellable or otherwise be treated so that the coating can be deformed. When the swelling is reduced, pockets may be formed within the coating. These pockets may be helpful in, say, increasing the hiding power of a paint.

The unsaturated carboxylic acid used in the treating may also be copolymerized although this copolymerization is not essential to the invention. Frequently, the carboxylic acid used in treating the basic aqueous dispersion of particles enhances the adherence of the polymer coating to the particulate solid and can enhance the scrub resistance of the coating.

To facilitate avoiding agglomerizations during processing, the dispersions can be subjected to mixing, for instance, high shear mixing. Examples include Cowles dispersing equipment, a Waring blender, a homogenizer, or an ultrasonic mixer. After encapsulation has commenced, it is often desirable to avoid mixing conditions that could adversely affect the integrity of the coating. The proportion of aqueous medium and particulate solids which are in the initial dispersion is not critical. Frequently, this proportion ranges from about 50 to about 80 weight percent of the particulate solids based on the combined weight of the aqueous medium and particulate solids. This dispersion can be let down, i.e., diluted with additional aqueous solution, e.g., to about 30 to about 75% of the particulate solids based on the combined weight of aqueous medium and particulate solids. The conditions of maintaining the dispersion of the particles in the water are not narrowly critical and can be varied over a wide range.

The amphiphilic component may be added to the aqueous medium in any convenient manner and, preferably, at a time prior to the initiation of the polymerization. Separate vessels may be employed for the treating and the polymerization, or the entire process may occur in one vessel. Contacting the particulate solids in the aqueous medium with the carboxylic acid and the polymerization step can be carried out sequentially High shear mixing can be carried out during the polymerizing step or no, low or non-shear mixing can be used during the polymerizing step.

With smaller particle sizes and for applications such as pigments in paint, the dispersion of the particulate solids is preferably reasonably stable, i.e., the dispersion does not immediately settle upon ceasing the mixing. Often, for these applications, appreciable settling of the particulate solids does not occur for a period of at least about 1, say, at least about 6, hours, and preferably, the dispersion is stable for about 10 to 1000 or more hours.

The polymerization conditions employed in the practice of this invention can vary widely depending upon the monomer and catalysts, if any, used. Conveniently, free radical type or redox-type polymerization systems are used. In general, free radical-type polymerization is carried out in the presence of a free radical initiator such as peroxygen compound, an azo catalyst, ultraviolet light or any other free radical initiator. Examples of suitable peroxygen compounds which can be employed as catalyst include inorganic persulfate compounds such as sodium persulfate, potassium persulfate and ammonium persulfate; peroxides such as hydrogen peroxide, t-butylhydrperoxide, dibenzoyl peroxide and dilauroyl peroxide; azo catalysts such as azobisisobutyronitrile, and other common free radical generating compounds. Also suitable are various forms of free radical generating radiation means such as ultraviolet radiation, electron beam radiation and gamma radiation. Preferably, free radical-type polymerization is carried out in the presence of a water-soluble peroxygen compound at temperatures in the range from about 40° to about 100° C.

Alternatively, a redox catalyst composition can be employed wherein the polymerization temperature usually ranges from 25° to about 80° C. Exemplary redox catalyst compositions include a peroxygen compound as described hereinbefore. preferably potassium persulfate or t-butylhydroperoxide and a reducing component such as sodium metabisulfite or sodium formaldehyde sulfoxylate. It is also suitable to employ various chain transfer agents such as mercaptans, e.g., dodecyl mercaptan; dialkyl xanthogen disulfides; diaryl disulfides and others listed by Blackley in *Emulsion Polymerization*, Chapter 8 in concentrations as described therein.

The catalyst concentration will be a factor in influencing the average molecular weight and molecular weight distribution of the hydrophobic polymer coating. With too much catalyst, the average molecules weight is low which leads to a weaker and less scrub resistant coating.

The catalyst concentration for both free radical-type and redox-type polymerization is normally in the range from about 0.005 to about 8, preferably from about 0.01 to about 5, and many times from about 0.1 to 0.5, weight percent based on the weight of total monomer.

High shear mixing during the polymerization may not only help in preventing agglomerization and/or settling of the particulate solids but also, it may help improve transfer of monomer to the hydrophobic zone at the surface of the particulate solid. This can enhance Encapsulation Efficiency. The monomer may be emulsified. In instances in which high Encapsulation Efficiencies are desired, the monomer is preferably not emulsified and dispersed using a dispersing agent in the aqueous medium. Without wishing to be limited to theory, it is believed that monomer-rich phases exist in the aqueous medium and that the monomer, with some degree of solubility in the aqueous phase (which may be very limited), is in equilibrium between the monomer phase and the aqueous phase. Surfactant present in the aqueous medium may also assist in the transfer of monomer. A similar equilibrium exists between the aqueous phase and the hydrophobic zone at the surface of the particulate solids where the hydrophobic polymer is sought. Thus, the high shear mixing can enhance transfer of monomer to the surface of the particulate solid and may tend to reduce the presence of conditions that enable the nucleation of polymer particles in the aqueous phase. The thickness of the coating may be selected over a wide range, e.g., from about 0.01 to 10, often, about 0.03 to 0.5, or 1, micron.

The coated particles can be removed from the aqueous medium or, especially in the case of pigments for latex paints, remain dispersed in the aqueous medium. The encapsulated particulate solids can have advantageous properties for recovery of the particulate solids in dry form without undue agglomeration. The particulate solids are capable of being redispersed in aqueous or other liquid medium without undue grinding. Moreover, the coated particulate solids may find use in molding compositions and the like.

EXAMPLES

The following examples are presented wherein all parts and percentages are on a weight basis, all temperatures are on the Centigrade scale, and the following designations are defined as follows.

A.T. I: a solution of 20 wt. % of a polymeric associative thickener having the formula:

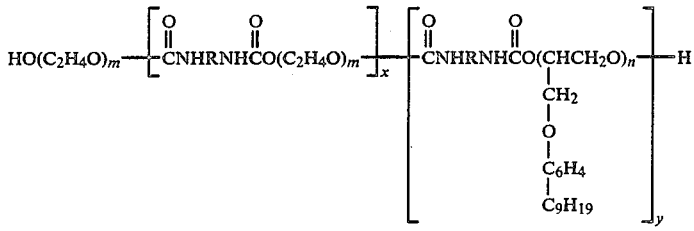

wherein R is a divalent organic group having the formula

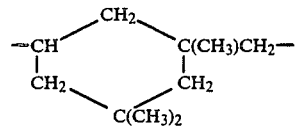

m has an average value of 180 to 230, n has an average value of greater than about 1 up to about 30, e.g., 1.5, x is an integer of about 5 to about 25, and y has an average value of greater than 1 to and a weight average molecular weight of about 150,000 to 200,000 16 wt. % butyl carbitol and 64 wt. % water. A.T. I is a polymer of the type described in U.S. Pat. No. 4,426,485.

A.D. I: a solution of 35 wt. % of an anionic dispersant believed to have the formula:

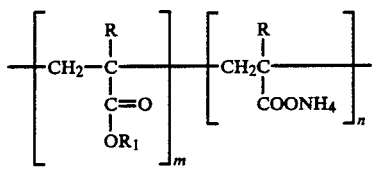

wherein $R_1$ is believed to be a lower alkyl or derivative thereof, m and n are integers and R is hydrogen or lower alkyl; and having a molecular weight of up to about 10,000. An aqueous solution of this anionic dispersant containing 65 wt. % water is marketed as Tamol TM SG-1 by Rohm and Haas Company, Philadelphia, Pennsylvania.

Defoaming Solution I: is believed to be a solution of 30 wt. % of a defoamer and 70 wt. % mineral oil marketed as DeeFo TM 495 by Ultra Adhesives Inc., of Paterson, New Jersey.

Igepal ® C0997: a solution of 70 wt. % of a non ionic surfactant (Igepal ® C0990) having the formula:

wherein n is an average of 100 and 30 wt. % water available from GAF Corp., New York, New York. (While "n" is reported by the manufacturer to one about 100, our analytical work indicates that "n" may be closer to 70.)

Tergitol ® NP-40: a solution of 70 wt. % of a non ionic surfactant having the formula:

and 30 wt. % water available from Union Carbide Corporation, Danbury, Connecticut.

Tergitol ® NP-70: a solution of 70 wt. % of a nonionic surfactant having the formula:

and 30 wt. % water available from Union Carbide Corporation, Danbury, Connecticut The following properties were observed for products of the Examples were obtained from the tests described below.

Hiding Power—ASTM D 2805-70
Gloss—ASTM D 523-78
Scrub Test—ASTM D 2486
Settling—Allowed to stand for about
  one week or other period as noted after which time
  the amount of settling was observed.

F. B. Steig, "Pigment/Binder Geometry", in *Pigment Handbook*, Vol. III (T. Patton, Ed.), Wiley-Interscience (1973) pp 203–217, noted a relationship between hiding power for titanium dioxide paints and pigment volume concentration (PVC). This relationship for conventional paints can be expressed as Expected Hiding Power (square feet per pound)=409 [0.9045−(PVC)$^{\frac{1}{2}}$].

Hence, singe pigment volume concentrations vary, the most meaningful comparisons should be related to the percent improvement over the theoretical Steig prediction:

% Hiding Power over Steig = $1 - \frac{\text{Observed hiding power}}{\text{Expected Hiding Power}}$.

EXAMPLE 1

A pigment grind was prepared by premixing 120 grams of water, 30 grams of DeeFo TM, 495 (30% solution), 102.9 grams of A.D.I., and 7863.69 grams of DuPont TiPure TM R-940 slurry (76.3% aqueous solution of Tipure TM R-900 containing a dispersant, biocide and defoamer) in a Cowles mixer. Then a mixture of 90 grams of A.T. I (20% solution) and 500 grams of water was added gradually to the above mixture and stirred at a dispersing speed of 1500 rpm. Mixing at 1500 rpm was continued for about 30 minutes. The resulting mixture was diluted with 726.7 grams of water to produce a 64.27 weight percent solids pigment grind.

A vinyl acrylic encapsulated pigment was prepared by premixing 110 grams of water and 3 grams of maleic acid. Then 128.6 grams of Igepal TM CO-990 (35% solution in water) and 667.15 grams of the pigment grind containing 424.34 grams of titanium dioxide were added with stirring to a two-liter reactor. After stirring the mixture for 45 minutes with a Lightnin TM mixer the reactor was heated slowly with a water bath to 63° C. Then 63.45 grams of vinyl acetate, 30 grams of t-butylhydroperoxide (0.75% aqueous solution) and 30 grams of sodium formaldehyde sulfoxylate (0.75% aqueous solution) were added and the mixture was heated to 65° C. for an additional 16 minutes.

Then 296.4 grams of vinyl acetate and 63.2 grams of butyl acrylate were added as a mixture over a 157 minute period (a 2.5 cc/min feed rate). During the same period 50 grams of t-butylhydroperoxide (0.1875% aqueous solution) and 50 grams of sodium formaldehyde sulfoxylate (0.1875% aqueous solution) were added over a 157 minute period (a feed rate of 0.316 cc/min). A catalyst composed of 5 grams of 3% t-butylhydroperoxide and 5 grams of 3% aqueous sodium formaldehyde sulfoxylate was added and the mixture was heated an additional sulfoxylate was added and the mixture was heated an additional 24 minutes at 65° C. The product was cooled to ambient temperature and stored in a glass container.

The hydrophobic polymer coating had a number average molecular weight of 90,000 and the product had an Encapsulation Efficiency of 95%, passed 1200 scrub cycles and exhibited a 21.8% better TiO$_2$ Scattering Coefficient (by the procedure disclosed by McNutt, et al., American Paint and Coatings Journal, Apr. 4, 1988) than a paint based commercial latex UCAR 376 when both contained 2 pounds of titanium dioxide per gallon.

EXAMPLE 2

A pigment grind is prepared by premixing 207 grams of water and 10 grams of DeeFo TM 495. To the premix is added 2621.23 grams of TiPure TM R-940 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 207 grams of water and 30 grams of A.T.I.

A vinyl acrylic monomer solution is prepared by mixing 156.3 grams of water, 64.3 grams of Tergitol TM NP-70. This mixture is then added to about 685.64 grams of the pigment grind. Then 5.16 grams of maleic anhydride are added. The solution is mixed thoroughly for about 15 minutes at ambient temperature. This mixture, while being mixed at about 150 rpm is gradually heated to about 65° C. During this heating process 64.3 grams of vinyl acetate, 60 grams of t-butylhydroperoxide (0.38% aqueous solution) and 60 grams of sodium formaldehyde sulfoxylate (0.38% aqueous solution) are added. Once this reaction mixture reaches 65° C. it is maintained under the agitation for about 10 minutes and then a mixture of vinyl acetate (315 grams) and butyl acrylate (67.5 grams) is added at a feed rate of about 2.77 milliliters per minute. Starting at the same time an equal weight mixture of 50 milliliters of t-butylhydroperoxide and 50 milliliters of sodium formaldehyde sulfoxylate (both 0.38% aqueous solutions) are added at a feed rate of about 0.34 milliliters per minute. After all monomer is added, 5 milliliters each of t-butylhydroperoxide (3% aqueous solution) and sodium formaldehyde sulfoxylate (3% aqueous solution) catalyst are added, the reaction mixture is maintained at 65° C. for about 30 minutes. The encapsulated product has an encapsulation efficiency of 89%.

EXAMPLE 3

A pigment grind is prepared by premixing 207 grams of water and 10 grams of DeeFo TM 495. To the premix is added 2621.23 grams of TiPure TM R-940 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 207 grams of water and 30 grams of A.T I.

A vinyl acrylic monomer solution is prepared by mixing 146 grams of water, 48.6 grams of Tergitol TM NP-70. This mixture is then added to about 657.51 grams of the pigment grind. Then 2.35 grams of maleic anhydride are added. The solution is mixed thoroughly for about 15 minutes at ambient temperature. This mixture, while being mixed at about 150 rpm is gradually heated to about 65° C. During this heating process 63.45 grams of vinyl acetate, 60 grams of t-butylhydroperoxide (0.38% aqueous solution) and 60 grams of sodium formaldehyde sulfoxylate (0.38% aqueous solution) are added. Once this reaction mixture reaches 65° C. it is maintained under the agitation for about 10 minutes and then a mixture of vinyl acetate (332.3 grams) and butyl acrylate (69.84 grams) is added at a feed rate of about 2.5 milliliters per minute. Starting at the same time an equal weight mixture of 50 milliliters of t-butylhydroperoxide and 50 milliliters of sodium formaldehyde sulfoxylate (both 0.38% aqueous solutions) are added at a feed rate of about 0.29 milliliters per minute. After all monomer is added, 5 milliliters each of t-butylhydroperoxide (3% aqueous solution) and sodium formaldehyde sulfoxylate (3% aqueous solution) catalyst are added, the reaction mixture is maintained at 65° C. for about 30 minutes. The encapsulated product has an encapsulation efficiency of 92%.

EXAMPLE 4

A pigment grind is prepared by premixing 207 grams of water and 10 grams of DeeFo TM 495. To the premix is added 2621.23 grams of TiPure TM R-940 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 207 grams of water and 30 grams of A.T.I.

A vinyl acrylic monomer solution is prepared by mixing 156.3 grams of water, 64.3 grams of Tergitol TM NP-70. This mixture is then added to about 685.64 grams of the pigment grind. Then 1.23 grams of maleic anhydride are added. The solution is mixed thoroughly for about 15 minutes at ambient temperature. This mixture, while being mixed at about 150 rpm is gradually heated to about 65° C. During this heating process 64.3 grams of vinyl acetate, 60 grams of t butylhydroperoxide (0.38% aqueous solution) and 60 grams of sodium formaldehyde sulfoxylate (0.38% aqueous solution) are added. Once this reaction mixture reaches 65° C. it is maintained under the agitation for about 10 minutes and then a mixture of vinyl acetate (315 grams) and butyl acrylate (67.5 grams) is added at a feed rate of about 2.5 milliliters per minute. Starting at the same time an equal weight mixture of 50 milliliters of t-butylhydroperoxide and 50 milliliters of sodium formaldehyde sulfoxylate (both 0.38% aqueous solutions) are added at a feed rate of about 0.29 milliliters per minute. After all monomer is added, 5 milliliters each of t-butylhydroperoxide (3% aqueous solution) and sodium formaldehyde sulfoxylate (3% aqueous solution) catalyst are added, the reaction mixture is maintained at 65° C. for about 30 minutes. The encapsulated product has an encapsulation efficiency of 100%.

EXAMPLE 5

(Comparative)

A pigment grind is prepared by adding 10 grams of DeeFo TM 495 to 1310.62 grams of TiPure TM R-940 titanium dioxide in a Cowles mixer. The mixing speed is increased from about 1000 to 1700 rpm during the addition. The grinding continues for about 30 minutes at about 1700 rpm.

A solution is prepared by mixing 1050 grams of water, 142.8 grams of Tergitol TM NP-70 and 15 grams of A.T.I. This mixture is then added to about 1320.62 grams of the pigment grind. The solution is mixed thoroughly for about 15 minutes at ambient temperature. This mixture, while being mixed at about 150 rpm is gradually heated to about 65° C. During this heating process 15 grams of t-butylhydroperoxide (3% aqueous solution) and 15 grams of sodium formaldehyde sulfoxylate (3% aqueous solution) are added. Once this mixture reaches 65° C. it is maintained under the agitation for about 10 minutes and then a mixture of vinyl versatate (180 grams), vinyl acetate (700 grams) and butyl acrylate (120 grams) is added at a feed rate of about 8.5 milliliters per minute. Starting at the same time an equal weight mixture of 20 milliliters of t-butylhydroperoxide and 20 milliliters of sodium formaldehyde sulfoxylate (both 3% aqueous solutions) are added at a feed rate of about 0.47 milliliters per minute. After all monomer is added, the reaction mixture is maintained at 65° C. for about 30 minutes. The encapsulated product has an encapsulation efficiency of 50%.

EXAMPLE 6

A pigment grind is prepared by premixing 34.3 grams of A.D.I and 10 grams of DeeFo ™ 495. To the premix is added 2621 23 grams of TiPure ™ R-940 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 429.1 grams of water.

A vinyl acrylic monomer solution is prepared by mixing 415 grams of water, 6.75 grams of A.T.I., and 128.6 grams of Igepal ™ C0990 (35 weight percent aqueous solution). This mixture is then added to about 703.3 grams of the pigment grind. Then 4.5 grams of methacrylic acid are added. The solution is mixed thoroughly for about 15 minutes at ambient temperature. This mixture, while being mixed at about 150 rpm is gradually heated to about 65° C. During this heating process 67.5 grams of vinyl acetate, 22 milliliters of t-butylhydroperoxide (3% aqueous solution) and 22 grams of sodium formaldehyde sulfoxylate (3% aqueous solution) are added. Once this reaction mixture reaches 65° C. it is maintained under the agitation for about 10 minutes and then a mixture of vinyl acetate (324 grams) and butyl acrylate (54 grams) is added at a feed rate of about 5.62 milliliters per minute. Starting at the same time an equal volume mixture of 24 milliliters of t-butylhydroperoxide and 24 milliliters of sodium formaldehyde sulfoxylate (both 3% aqueous solutions) are added at a feed rate of about 0.276 milliliters per minute After all monomer is added, the reaction mixture is maintained at 65° C. for about 30 minutes. The encapsulated product has an encapsulation efficiency of 86%.

EXAMPLE 7

The procedure of Example 6 is substantially followed except that only 2.25 grams of methacrylic acid are added in the vinyl acrylic monomer solution and another 2.25 grams are combined with the vinyl acetate and butyl acrylate solution added during the encapsulation (which is added at a rate of 5.22 milliliters per minute). The encapsulation efficiency is 68%. This lower efficiency is believed to be due to virtually only the initially added methacrylic acid being available to enhance Encapsulation Efficiency.

EXAMPLE 8

A pigment grind is prepared by premixing 207 grams of water, and 10 grams of DeeFo ™ 495. To the premix is added 2621.23 grams of TiPure ™ R-942 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 207 grams of water and 30 grams of A.T.I.

A vinyl acrylic monomer solution is prepared by mixing 152 grams of water, 64.3 grams of Tergitol ™ NP-70. This mixture is then added to about 685.64 grams of the pigment grind. Then 2.52 grams of maleic anhydride are added. The solution is mixed thoroughly for about 15 minutes at ambient temperature. This mixture, while being mixed at about 150 rpm is gradually heated to about 65° C. During this heating process 67.5 grams of vinyl acetate, 60 grams of t-butylhydroperoxide (0.38% aqueous solution) and 60 grams of sodium formaldehyde sulfoxylate (0.38% aqueous solution) are added. Once this reaction mixture reaches 65° C. it is maintained under the agitation for about 10 minutes and then a mixture of vinyl acetate (315 grams) and butyl acrylate (67.5 grams) is added at a feed rate of about 2.5 milliliters per minute. Starting at the same time an equal weight mixture of 50 grams of t-butylhydroperoxide and 50 grams of sodium formaldehyde sulfoxylate (both 0.38% aqueous solutions) are added at a feed rate of about 0.30 milliliters per minute. After all monomer is added, milliliters each of t-butylhydroperoxide (3% aqueous solution) and sodium formaldehyde sulfoxylate (3% aqueous solution) catalyst are added, the reaction mixture is maintained at 65° C. for about 30 minutes. The encapsulated product has

EXAMPLE 9

(Comparative)

The procedure of Example 8 is substantially repeated except that, no maleic anydride is added. The encapsulation efficiency is 28%

EXAMPLE 10

The procedure of Example 8 is substantially repeated except that a titanium dioxide slurry available as CR-8005 available from Kerr-McGee Corporation is used. The encapsulation efficiency is 102%.

EXAMPLE 11

(Comparative)

The procedure of Example 10 is substantially repeated except that no maleic anhydride is added. The encapsulation efficiency is about 50%.

EXAMPLE 12

(Comparative)

The procedure of Example 8 is substantially repeated except that a titanium dioxide slurry available as RCS-9 available from SCM Corporation is used. The encapsulation efficiency is 42%. This is approximately the same encapsulation efficiency as is achieved in the absence of maleic anhydride. The dispersants used in RCS-9 are not known but are believed not to be amine-based dispersants.

EXAMPLE 13

(Comparative)

A pigment grind is prepared by premixing 207 grams of water and 10 grams of DeeFo ™ 495. To the premix is added 2621.23 grams of TiPure ™ R-940 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 207 grams of water and 30 grams of A.T.I.

A vinyl acrylic monomer solution is prepared by mixing 156.3 grams of water and 64.3 grams of Tergitol ™ NP-70 This mixture is then added to about 685.64 grams of the pigment grind. Then 1.5 grams of acetic acid are added. The solution is mixed thoroughly for about 15 minutes at ambient temperature. This mixture, while being mixed at about 150 rpm is gradually heated to about 65° C. During this heating process 64.3 grams of vinyl acetate, 60 grams of t-butylhydroperoxide (0.38% aqueous solution) and 60 grams of sodium formaldehyde sulfoxylate (0.38% aqueous solution) are added. Once this reaction mixture reaches 65° C. it is maintained under the agitation for about 10 minutes and then a mixture of vinyl acetate (315 grams) and butyl acrylate (67.5 grams) is added at a feed rate of about 2.5 milliliters per minute. Starting at the same time an equal weight mixture of 50 milliliters of t-butylhydroperoxide and 50 milliliters of sodium formaldehyde sulfoxylate (both 0.38% aqueous solution) are added at a feed rate of about 0.41 milliliters per minute. After all monomer is added, 5 milliliters each t-butylhydroperoxide (3% aqueous solution) and sodium formaldehyde sulfoxylate (3% aqueous solution) catalyst are added, the reaction mixture is maintained at 65° C. for about 30 minutes. The product has an encapsulation efficiency of 42%. Acetic acid does not provide the encapsulation efficiencies of the ethylenically unsaturated carboxylic acids of this invention.

EXAMPLE 14
(Comparative)

The procedure of Example 13 is substantially repeated except that 2.90 grams of an 85% phosphoric acid solution in water are used in place of the acetic acid. The encapsulation efficiency is about 15%.

EXAMPLE 15
(Comparative)

A pigment grind is prepared by premixing 107 grams of water and 10 grams of DeeFo ™ 495. To the premix is added 2621.23 grams of TiPure ™ R-942 titanium dioxide while the premix is under agitation in a Cowles mixer. The mixing speed is increased from about 1000 to 1700 rpm during the addition. The grinding continues for about 30 minutes at about 1700 rpm. The resulting grind is then diluted with about 207 grams of water and 30 grams of A.T.I.

A vinyl acrylic monomer solution is prepared by mixing 156.3 grams of water, 64.3 grams of Tergitol ™ NP-70. This mixture is then added to about 685.64 grams of the pigment grind. Then 5.6 grams of citric acid in aqueous solution are added to achieve a pH of 7.05. The solution is mixed thoroughly for about 15 minutes at ambient temperature. This mixture, while being mixed at about 150 rpm is gradually heated to about 65° C. During this heating process 67.5 grams of vinyl acetate, 60 grams of t-butylhydroperoxide (0.38% aqueous solution, and 60 grams of sodium formaldehyde sulfoxylate (0.38% aqueous solution) are added Once this reaction mixture reaches 65° C. it is maintained under the agitation for about 10 minutes and then a mixture of vinyl acetate and butyl acrylate (in an approximate weight ratio of 4.7:1) is added at a feed rate of about 2.5 milliliters per minute for about 166 minutes. Starting at the same time an equal weight aqueous mixture of t-butylhydroperoxide and 50 milliliters of sodium formaldehyde sulfoxylate (both 0.38% aqueous solution) are added at a feed rate of about 0.3012 milliliters per minute for a period of about 166 minutes. After all monomer is added, 5 cc each of t-butylhydroperoxide (3% aqueous solution) and sodium formaldehyde sulfoxylate (3% aqueous solution) catalyst are added, the reaction mixture is maintained at 65° C. for about 30 minutes. The product has an encapsulation efficiency of 28%.

It is claimed:

1. Processes for coating finely-divided particles contained in a stabilized aqueous dispersion containing a basic dispersant, said particles having a surface which, in the absence of said basic dispersant, is capable of adsorbing hydrophilic polymer, comprising:
   a. treating the aqueous dispersion with ethylenically-unsaturated carboxylic acid represented by the formula $$H(R^1)C=R^2C(O)OH$$

wherein $R^2$ is $-C(H)(R^3)(CH_2)_x-$ wherein x is 0 to about 4 and $R^1$ and $R^3$ are each H, $-C(O)OR^4$, $-CH_2C(O)OR^4$, substituted or unsubstituted alkyl of 1 to about 20 carbon atoms, substituted or unsubstituted mono- or bi-cyclic aryl or alkaryl of 7 to 30 carbon atoms; wherein $R^4$ is H or lower alkyl of 1 to about 6 carbon atoms, with the proviso that only one of $R^1$ and $R^3$ can be H, in an amount and for a time and at a temperature sufficient to enhance Encapsulation Efficiency;
   b. providing in said aqueous dispersion a sufficient amount of at least one amphiphilic component to enhance the stability of the aqueous dispersion under polymerization conditions; and
   c. supplying to the treated aqueous dispersion containing said at least one amphiphilic component, addition polymerizable material and subjecting the aqueous dispersion to polymerization conditions to form a polymer coating on the particles wherein the treatment in step a is for a sufficient period prior to initiation of the polymerization to enhance the Encapsulation Efficiency.

2. Process according to claim 1 wherein the carboxylic acid comprises at least one of maleic acid, maleic anhydride, fumaric acid and methacrylic acid.

3. Processes according to claim 1 wherein the amphiphilic component comprises nonionic surfactant.

4. Processes according to claim 1 wherein the total amphiphilic component is present in an amount insufficient to reduce the Encapsulation Efficiency.

5. Processes according to claim 4 wherein the amphiphilic component comprises nonionic surfactant.

6. Processes according to claim 4 wherein the amphiphilic component comprises amphiphilic polymer having a hydrophilic backbone which is a hydrocarbyl-containing chain having a weight average molecular weight of at least about 3000 and having a hydrophobic moiety on average less than 2.5 carbon atoms apart and having at least one lipophilic segment pendant from the backbone such that the amphiphilic polymer exhibits an LHB value of at least about 1.5.

7. Processes according to claim 6 wherein the polymeric backbone of the amphiphilic polymer has a hydrophilicity at least equivalent to $-(CH_2CH_2O)_{70}-H$.

8. Processes according to claim 7 wherein the hydrophilic backbone of the amphiphilic polymer comprises $-(CH_2CH_2O)-$ units.

9. Processes according to claim 8 wherein the amphiphilic polymer exhibits an LHB value of at least about 2 and has at least about 50 $-(CH_2CH_2O)-$ units.

10. Processes according to claim 1 wherein the treatment with carboxylic acid is conducted under agitation.

11. Processes according to claim 1 wherein the polymerization is conducted under agitation.

12. Processes according to claim 1 wherein the basic dispersant comprises amine.

13. Processes according to claim 1 wherein the pH of the aqueous dispersion upon treatment with carboxylic acid is between about 7 and 8.8.

14. Processes according to claim 1 wherein the carboxylic acid is present in an amount of about 0.05 to 5 weight percent of the aqueous dispersion.

15. Processes according to claim 6 wherein the carboxylic acid comprises at least one of maleic acid, maleic anhydride, fumaric acid and methacrylic acid.

16. Processes according to claim 3 wherein the carboxylic acid comprises at least one of maleic acid, maleic anhydride, fumaric acid and methyacrylic acid.

17. Processes according to claim 16 wherein the basic dispersant comprises amine.

18. Processes according to claim 17 wherein the pH of the aqueous dispersion upon treatment with carboxylic acid is between about 7 and 8.8.

19. Processes according to claim 17 wherein the carboxylic acid is present in an amount of about 0.05 to 5 weight percent of the aqueous dispersion.

20. Processes according to claim 18 wherein the carboxylic acid comprises at least one of maleic acid and maleic anhydride.

* * * * *

UNITED STATES PATENT AND TRADEMARK OFFICE
CERTIFICATE OF CORRECTION

PATENT NO. : 4,981,882
DATED : 1 January 1991
INVENTOR(S) : Smith et al.

It is certified that error appears in the above-identified patent and that said Letters Patent is hereby corrected as shown below:

Add a period, i.e. -- . --, at each following location: column 3, line 62 after "disclosed"; column 5, line 44 after "0"; column 6, line 62 after "0"; column 15, line 2 after "sequentially"; and column 21, line 34 after "minute". Add a dash, i.e. -- - --, at each following location: column 5, line 7 after "mono"; column 5, line 13 after "water"; column 15, line 17 after "radical"; column 17, line 30 after "non", column 17, line 40 after "non"; column 20, line 20 after "t"; and column 23, line 19 after "ethylenically". Column 6, line 23, after "inert" add -- filler materials such as titanates and talc; --. Column 9, line 26, change "celluosic" to -- cellulosic --. Column 15, line 26, change "t-butylhydrperoxide" to -- t-butylhydroperoxide --. Column 15, line 40, change the period, i.e. "." to a comma, i.e. -- , --. Column 17, line 4, after "1 to" add -- 10 --. Change "non ionic" to -- non-ionic -- at both following locations: column 17, line 30 and column 17, lines 40-41. Column 17, line 43, in the formula, after "$(C_2H_4O)$" add -- $_{40}$ -- (subscripted). Column 22, line 17, after "has" add -- an encapsulation efficiency of 92% --. Column 22, line 23, after "that" delete the comma, i.e. ",". Column 23, line 19, change "ethylenically unsaturated" to -- ethylenically-unsaturated --. Column 24, line 35, in claim 2 at line 1, change "Process" to -- Processes --. Column 25, line 12, in claim 16 at line 3, change "methyacrylic" to -- methacrylic --.

Signed and Sealed this

Twenty-first Day of July, 1992

Attest:

DOUGLAS B. COMER

Attesting Officer

Acting Commissioner of Patents and Trademarks